Patented Dec. 2, 1947

2,431,873

UNITED STATES PATENT OFFICE 2,431,873

METHOD OF COATING THERMOPLASTICS WITH SILICA

Reginald Grice Kennelly, Longmeadow, Mass., assignor to Monsanto Chemical Company, St. Louis, Mo., a corporation of Delaware No Drawing. Application October 3, 1944, Serial No. 557,057

6 Claims. (Cl. 117—138.8)

This invention relates to self-supporting webs or films of heat-sealable thermoplastic materials. More particularly, the invention relates to webs of heat-sealable vinyl resins for use in the packaging and container fields.

The use of heat-sealable plastic materials as a packaging material is desirable due to their imperviousness to moisture, their toughness and to the variety of colors and transparencies that may be obtained. A major difficulty in their use has been the tendency for the webs to cohere during storage prior to use. One method proposed to avoid this difficulty provides for storing at relatively low temperatures but this has not been entirely satisfactory because it required the use of expensive refrigerating apparatus. Another method includes dusting with a powder such as stearic acid, talc or borax but cleaning and washing apparatus is required to remove the dusting compound before the plastic material can be used.

It is an object of this invention to provide a heat-sealable web of thermoplastic material which will not stick to itself in transit or in storage at the extremes of terrestrial temperature conditions.

Another object is to coat with material which does not require removal before use.

These and other objects are attained by depositing on a web of thermoplastic material a thin, transparent coating of silica. The coating is obtained by applying a silica organosol or organoaquasol to the surfaces of the web and allowing the liquids to evaporate leaving a thin transparent coating of silica tightly adherent to the web.

The following is an exemplification of this invention which is not limited to the details set forth.

Example

A web of polyvinyl butyral resin was cut into four pieces. The surfaces of two pieces were wiped with a cloth wet with a silica organosol and allowed to dry. The other two pieces were untreated. The two sets were subjected to a "blocking" test comprising placing one piece on the other and applying a pressure of 0.3 p. s. i. at a temperature of 150° F. After 48 hours under the test conditions, the untreated set was so badly coalesced that the pieces could be separated only with difficulty whereas the treated pieces showed no tendency to cohere.

The treated pieces were then placed together and subjected to a standard method for heat sealing which comprises heating overlapping pieces of the material at 300° F. in a standard Amsco heat sealer using a foot pedal to apply pressure. The treated pieces sealed in 1 second under the conditions of this test.

The organosols and organoaquasols which may be used according to this invention are stable dispersions of silica in organic liquids such as, for example, methanol, ethanol, propanol, ethyl ether of ethylene glycol and propyl silicate and may contain up to 43% water. They may be made from silica hydrosols by replacement of all or part of the water with an organic liquid by dialysis, or other well-known methods.

The organosols and organoaquasols are low viscosity liquid dispersions and may be applied to the thermoplastic web by any of the known means for applying coatings such as, for example, spraying, roll coating, dipping, brushing, wiping, etc. The coatings thus produced may be dried slowly at room temperature or more rapidly by increasing the temperature and/or providing a counter-current of air. They are tightly adherent to the surface of the plastic web. They cannot be easily removed by spraying with water or rubbing with a dry cloth. For example, a strip of treated plasticized polyvinyl butyral resin was stretched until the coating showed as a white bloom of fine particles. After the sheet had relaxed to its original size, it was washed with water, rubbed dry and subjected to the "blocking" test. No cohesion was obtained in the test.

The web of thermoplastic material may comprise thermoplastic materials such as vinyl polymers, e. g., polyvinyl alcohol, polyvinyl acetate, polyvinyl halides, polyvinyl acetals such as polyvinyl formal or polyvinyl butyral, polystyrene, polymerized halostyrenes, polyvinyl ketones; polyvinylidene halides such as polyvinylidene chloride; acrylic polymers e. g., polymerized acrylic acid, methacrylic acids or their esters such as methyl acrylate and methyl methacrylate, polyacrylonitrile; copolymers of two or more vinyl compounds, acrylic compounds or mixtures of vinyl and acrylic compounds e. g. vinyl chloride and vinyl acetate, methyl acrylate and acrylic acid, vinyl chloride and methylacrylate styrene and vinyl chloride, styrene and methylacrylate; other copolymers such as vinyl chloride-vinylidene chloride, styrene-maleic anhydride copolymers; regenerated cellulose; cellulose derivatives, e. g., cellulose acetate, cellulose acetobutyrate, cellulose nitrate, ethyl cellulose; natural rubber, and its derivatives such as rubber hydrochloride and chlorinated rubber; synthetic rubbers e. g. butadiene copolymers with styrene or acrylonitrile. The web may also comprise mixtures of the above resins. The thermoplastic materials may be modified with plasticizers, lubricants, fillers, colors, etc.

The coating of silica on the web must be at least approximately .0001″ thick in order to obtain adequate protection in the "blocking" test. The upper limit of thickness is about .003″ since any substantial increase beyond that point may interfere with effective heat-sealing.

The treated webs of this invention may be used for wrapping or packaging materials and as corrosion resistant covers to protect machinery. They may also be used as the plastic interlayer sheets for laminated glass and certain types of plywood. The webs will not stick together when piled one on another at temperatures up to 150° F. and articles protected by the webs may be packed tightly together without danger of their wrappers cohering.

The foregoing description is intended to be illustrative and not limitative of the invention as defined in the appended claims.

What is claimed is:

1. The method of making a heat-sealable non-blocking thermoplastic web which comprises applying a coating of a silica organosol to the thermoplastic web and removing the organic liquid from the coating.

2. The method of claim 1 wherein the thermoplastic web comprises a cellulose derivative.

3. The method of claim 1 wherein the thermoplastic web comprises a vinyl resin.

4. The method of claim 1 wherein the thermoplastic web comprises a polyvinyl butyral resin.

5. The method of making a heat-sealable non-blocking thermoplastic web which comprises applying a coating of a silica organo aquasol to the thermoplastic web and removing the liquid from the coating.

6. The method of making a heat-sealable, non-blocking, thermoplastic web which comprises applying a coating selected from the group consisting of silica organosols and silica organo aquasols to the thermoplastic web and removing the liquid from the coating.

REGINALD GRICE KENNELLY.

REFERENCES CITED

The following references are of record in the file of this patent:

UNITED STATES PATENTS

| Number | Name | Date |
|---|---|---|
| 2,027,931 | Ray | Jan. 14, 1936 |
| 2,329,632 | Marsden | Sept. 14, 1943 |
| 2,386,259 | Norton | Oct. 9, 1945 |
| 2,008,815 | Brandenberger | July 23, 1935 |

FOREIGN PATENTS

| Number | Country | Date |
|---|---|---|
| 502,978 | Great Britain | Mar. 29, 1939 |
| 466,482 | Great Britain | May 28, 1937 |
| 492,985 | Great Britain | Sept. 30, 1938 |
| 505,502 | Great Britain | May 11, 1939 |
| 317,936 | Great Britain | Aug. 29, 1929 |